United States Patent [19]
Saitou et al.

[11] Patent Number: 6,157,246
[45] Date of Patent: Dec. 5, 2000

[54] LOAD DRIVING CIRCUIT WITH BOOSTING TIMING CONTROL

[75] Inventors: Mitsuhiro Saitou, Oobu; Hiroyuki Ban, Aichi-ken, both of Japan

[73] Assignee: Denso Corporation, Kariya, Japan

[21] Appl. No.: 09/109,732

[22] Filed: Jul. 2, 1998

[30] Foreign Application Priority Data

Jul. 3, 1997 [JP] Japan ..................... 9-178554

[51] Int. Cl.⁷ ..................................................... G05F 1/10
[52] U.S. Cl. ..................... 327/540; 340/438; 340/463
[58] Field of Search ..................... 327/536, 538, 327/540; 340/436, 438, 441, 453, 465, 463

[56] References Cited

U.S. PATENT DOCUMENTS

| | | | |
|---|---|---|---|
| 5,564,737 | 10/1996 | Ito et al. | 280/735 |
| 5,596,497 | 1/1997 | Honda | 364/424.055 |
| 5,668,528 | 9/1997 | Kitao et al. | 340/436 |
| 5,701,096 | 12/1997 | Higashiho | 327/536 |
| 5,757,228 | 5/1998 | Furutani et al. | 327/536 |

FOREIGN PATENT DOCUMENTS

4-72061  6/1992  Japan .

*Primary Examiner*—Jung Ho Kim
*Attorney, Agent, or Firm*—Pillsbury Madison & Sutro LLP

[57] ABSTRACT

The present invention is aimed at avoiding noise generation accompanying switching actions in booster circuits for a load such as an air-bag driving circuit. In an air-bag driving circuit, which is designed to actuate an igniting transistor 13 in response to output of a collision detecting signal from a collision detector 7 for detecting a collision condition of a vehicle so as to supply an igniting current to a squib 11 based on a voltage boosted by booster circuits 4 and 5, the boosting operation of the booster circuits 4 and 5 is inhibited while the collision detecting signal is absent and started when the collision detecting signal is output from the collision detector 7.

18 Claims, 5 Drawing Sheets

FIG. 5

LOAD DRIVING CIRCUIT WITH BOOSTING TIMING CONTROL

BACKGROUND OF THE INVENTION

1. Field of the Invention

The present invention relates to a load riving circuit, and in particular, to a driving circuit for a crew protecting device such as an air bag, or suitable for an ABS (Anti-lock Break System) or the like.

2. Description of the Prior Art

In a conventional air bag driving circuit, when a collision condition of a vehicle is detected, a vehicle-mounted battery or back-up condenser supplies ignition current to an igniter (hereinafter, called a squib) so that an air bag will expand.

Such a conventional air bag driving circuit also includes a booster circuit so that the minimum operating voltage of the driving circuit can be secured even if battery wiring is disconnected by collision of the vehicle.

In the booster circuit, however, switching of each circuit element causes noise. To prevent generation of the noise, a protection element such as a filter is provided in the conventional booster circuit.

SUMMARY OF THE INVENTION

It is an object of the present invention to prevent generation of the noise from the booster circuit without provision of such a protection element for noise prevention.

To achieve the object, according to the present invention, boosting timing is controlled such that a booster circuit is basically actuated only when a load driving signal occurs. Thus the booster circuit does not generate any oscillation noise when the signal is absent.

As shown in the following embodiments, the present invention is applied more properly to a circuit that is actuated in such an emergency as to make traveling of the vehicle abnormal.

In one aspect of the present invention, booster circuits start boosting in response to output of a collision detecting signal from collision detecting means.

The booster circuits perform the boosting operation only when required due to a collision condition of the vehicle. Since the booster circuits do not perform the boosting operation when the vehicle is not in the collision condition, noise generation accompanying switching actions in the booster circuits can be avoided.

In another aspect of the present invention, the boosting operation is performed by raising the oscillation frequency of an oscillator circuit in each booster circuit in response to output of the collision detecting signal from the collision detecting means.

Since collisionless conditions of the vehicle make the oscillation frequency of the oscillator circuit lower than the collision condition, noise generation accompanying switching actions in the booster circuits can be reduced.

In yet another aspect of the present invention, a boosted voltage across a booster circuit is used for gate voltage control of a field effect transistor in a constant current circuit that regulates supply current to an igniter to a constant value. It is therefore possible to supply a stable constant-current flow to the igniter even when a voltage across power supply means drops.

BRIEF DESCRIPTION OF THE DRAWINGS

These and other objects and features will become more readily apparent from the following detailed description taken in conjunction with the accompanying drawings in which.

DETAILED DESCRIPTION OF THE PREFERRED EMBODIMENTS

The present invention will be described below with respect to preferred embodiments shown in the accompanying drawings.

(First Embodiment)

Figure 1:
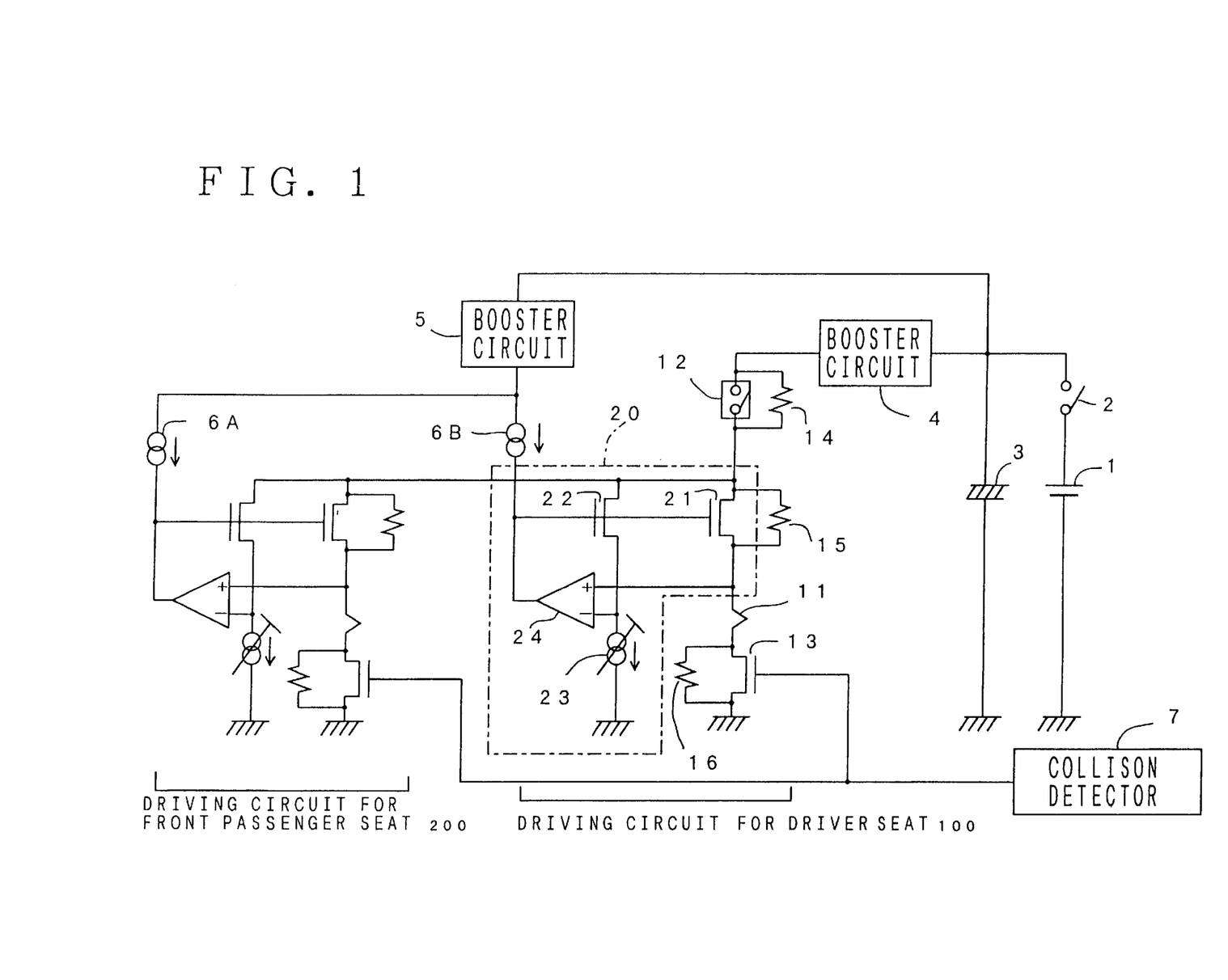
FIG. 1 is a diagram of an air bag driving circuit according to the first embodiment of the present invention.

FIG. 1 shows an air bag driving circuit according to the first embodiment of the present invention. In FIG. 1, the air bag driving circuit includes a driving circuit 100 for a driver seat and a driving circuit 200 for a front passenger seat. The driving circuits 100 and 200 are to expand air bags for driver and front passenger seats respectively.

The driving circuits 100 and 200 are supplied with a battery voltage from a vehicle-mounted battery by means of an ignition switch 2, or a battery voltage stored in a back-up condenser (energy storing means) 3, through booster circuits 4, 5 and constant current circuits 6A, 6B, respectively. Hereinbelow, the battery voltage is called the power-supply voltage.

The booster circuit 4 is used for supplying ignition current and the booster circuit 5 is used for control of regulation of the ignition current to a constant current. The constant current circuits 6A and 6B are provided for allowing the booster circuit 5 to supply a boosted voltage to the driving circuits 100 and 200, respectively.

The driving circuit 100 for the driver seat and the driving circuit 200 for the front passenger seat expand respective air bags in response to output of a collision detecting signal from a collision detector 7. The collision detector 7 has a semiconductor acceleration sensor for detecting an acceleration of the vehicle, which outputs a high-level collision detecting signal when the detected acceleration shows a collision condition of the vehicle.

Since the driving circuit 100 for the driver seat and the driving circuit 200 for the front passenger seat are the same, the configuration and operation thereof are described by taking the driving circuit 100 as an example.

In the driving circuit 100 for the driver seat, a mechanical collision sensor (safety sensor) 12 and an igniting power transistor (N-channel MOS power transistor) 13 are connected in series with a squib 11 that expands the air bag for the driver seat. When supplied with the high-level collision detecting signal from the collision detector 7, the igniting power transistor 13 is turned on to supply an igniting current to the squib 11.

A constant current circuit 20 then regulates the igniting current to supply a constant current to the squib 11. The constant current circuit 20 includes an N-channel MOS transistor for current supply (hereinafter, called a force Tr) 21 connected in series with the squib 11; an N-channel MOS transistor for current detection (hereinafter, called a sense Tr) 22 connected in parallel to the force Tr 21 so as to form a current mirror circuit with the force Tr 21; a constant current source 23 for supplying a constant current to the sense Tr 22; and an operational amplifier circuit 24 with the inverting input terminal connected to the source of the sense Tr 22 and the non-inverting input terminal connected to the source of the force Tr 21.

The operational amplifier circuit 24 controls voltages at the gates of the force Tr 21 and the sense Tr 22 to make voltages at both sources equal so as to flow a constant current from the force Tr 21 into the squib 11 when the igniting power transistor 13 is turned on.

The operational amplifier circuit 24 uses a boosted voltage, supplied from the boosting circuit 5 through the constant current circuit 6, for control of voltages at the gates of the force Tr 21 and the sense Tr 22. Such control enables the force Tr 21 and the sense Tr 22 to maintain a high gate voltage of about 24 volts even when the power-supply voltage becomes lower than 5 volts, thus supplying a constant current.

The mechanical collision sensor 12, the force Tr 21 and the igniting power transistor 13 are shunted with resistors 14, 15 and 16, respectively. These shunts are used when a self-diagnostic circuit performs a self diagnosis. In such a case, the self-diagnostic circuit turns on the igniting power transistor 13 to yield a small current not enough to start an igniting action of the squib 11 so as to detect a breakdown of each circuit portion by detecting a voltage across the portion at each resistor.

Next, the operation of the driving circuit 100 for the driver seat is described.

When the vehicle is in a collisionless condition and no collision detecting signal is output from the collision detector 7, the igniting power transistor 13 is off-state.

When the vehicle becomes a collision condition and the collision detecting signal is output from the collision detector 7, the igniting power transistor 13 is turn on. The mechanical collision sensor 12 has already been turned on when the collision detector 7 detects the collision condition of the vehicle. This provides a path for ignition current from the booster circuit 4 through he mechanical collision sensor 12, the force Tr 21 and squib 11 to the igniting power transistor 13.

The constant current circuit 20 makes the ignition current constant. In this case, it regulates the ignition current to a current value determined relative to the value of a current flowing in the constant current source 23 according to a current-mirror ratio of the force Tr 21 and the sense Tr 22. If the current flow in the constant current source 23 is 1.2 microamperes and the current-mirror ratio is 100:1, the ignition current is regulated to a constant current of 1.2 amperes.

This current regulating operation is described below. Assuming that the current flowing in the force Tr 21 becomes higher than 1.2 amperes, a gate-source voltage VGS of the force Tr 21 increases and a voltage at the source of the force Tr 21 drops. Since the current flow in the sense Tr 22 is kept constant at 1.2 microamperes, a gate-source voltage of the sense Tr 22 is held constant. For this reason, the operational amplifier circuit 24 drops the gate voltages of the sense Tr 22 and the force Tr 21, and hence decreases the current in the force Tr 21. When the current flowing in the force Tr 21 becomes lower than 1.2 amperes, since the gate-source voltage VGS of the force Tr 21 drops and the voltage at the source of the force Tr 21 becomes larger than that of the sense Tr 22, the operational amplifier circuit 24 raises the gate voltages of the sense Tr 22 and the force Tr 21, and hence increases the current in the force Tr 21. Such circuit operation makes it possible to regulate the current flow in the force Tr 21, or the ignition current flowing through the squib 11, to a constant value of 1.2 amperes.

The constant current circuit 20 acts to equalize the voltage at each drain, gate and source of the force Tr 21 and the sense Tr 22 constituting a current mirror circuit. This action makes the current in the sense Tr 22 constant and hence the ignition current in the force Tr 21 constant.

In the case the back-up condenser 3 provides power because of cutoff of power supply from the vehicle-mounted battery 1 at the time of collision of the vehicle, the power-supply voltage gradually drops. Even in this case, the constant current circuit 20 can use the boosted voltage from the booster circuit 5 to increase a gate-voltage rise of the force Tr 21 and the sense Tr 22. It is therefore possible to ensure the operation of the constant current circuit 20 so as to supply a constant current to the squib 11 even at low poewr-supply voltage.

Figure 2:
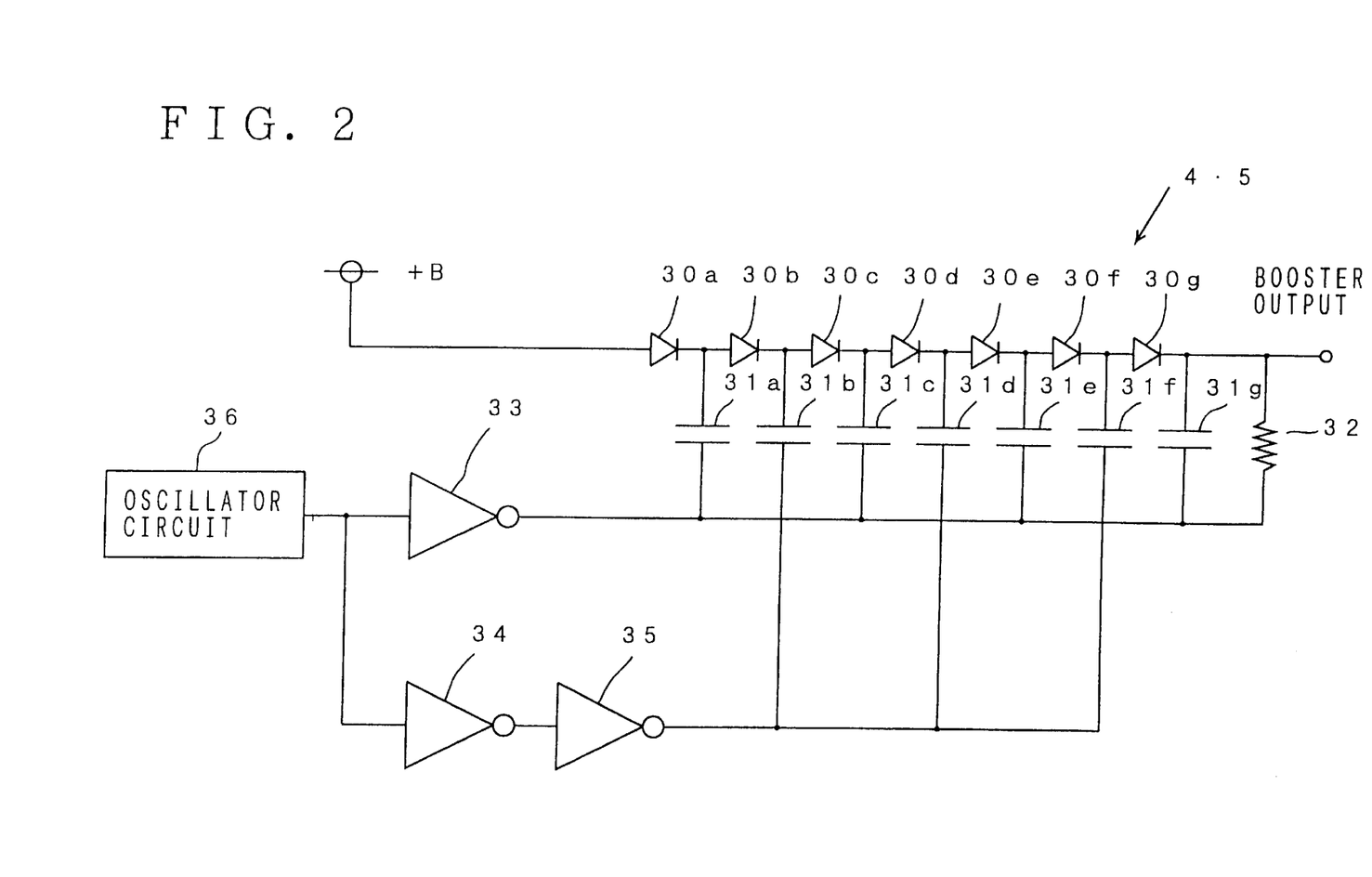
FIG. 2 is a diagram showing a concrete circuit configuration of booster circuits 4 and 5 in FIG.

Next, the configuration of the booster circuits 4 and 5 is described. FIG. 2 shows a specific circuit configuration. The booster circuit is a so-called charge-up pump circuit, which includes diodes 30a to 30g, capacitors 31a to 31g, a resistor 32, inverters 33 to 35 and an oscillator circuit 36.

The capacitors 31a, 31c, 31e and 31g are charged and discharged according to the output of the inverter 33, while the capacitors 31b, 31d and 31f are charged and discharged according to the output of the inverter 34. Outputs of the inverters 33 and 35 show anti-phase and in-phase relations to the output of the oscillator circuit 36, respectively. For this reason, when the capacitors 31a, 31c, 31e and 31g are charged, the capacitors 31b, 31d and 31f are discharged; when the capacitors 31a, 31c, 31e and 31g are discharged, the capacitors 31b, 31d and 31f are charged.

The use of rectifying action of the diodes 30a to 30g, in addition to alternate charge and discharge actions of the capacitors 31a, 31c, 31e and 31g, and the capacitors 31b, 31d and 31f, enables the voltage at each junction of the diodes 30a to 30g and the capacitors 31a to 31g to be boosted step by step from a power-supply voltage (+B). Finally, a desired boosted voltage is output from the junction of the diode 30g and the capacitor 31g.

Figure 3:
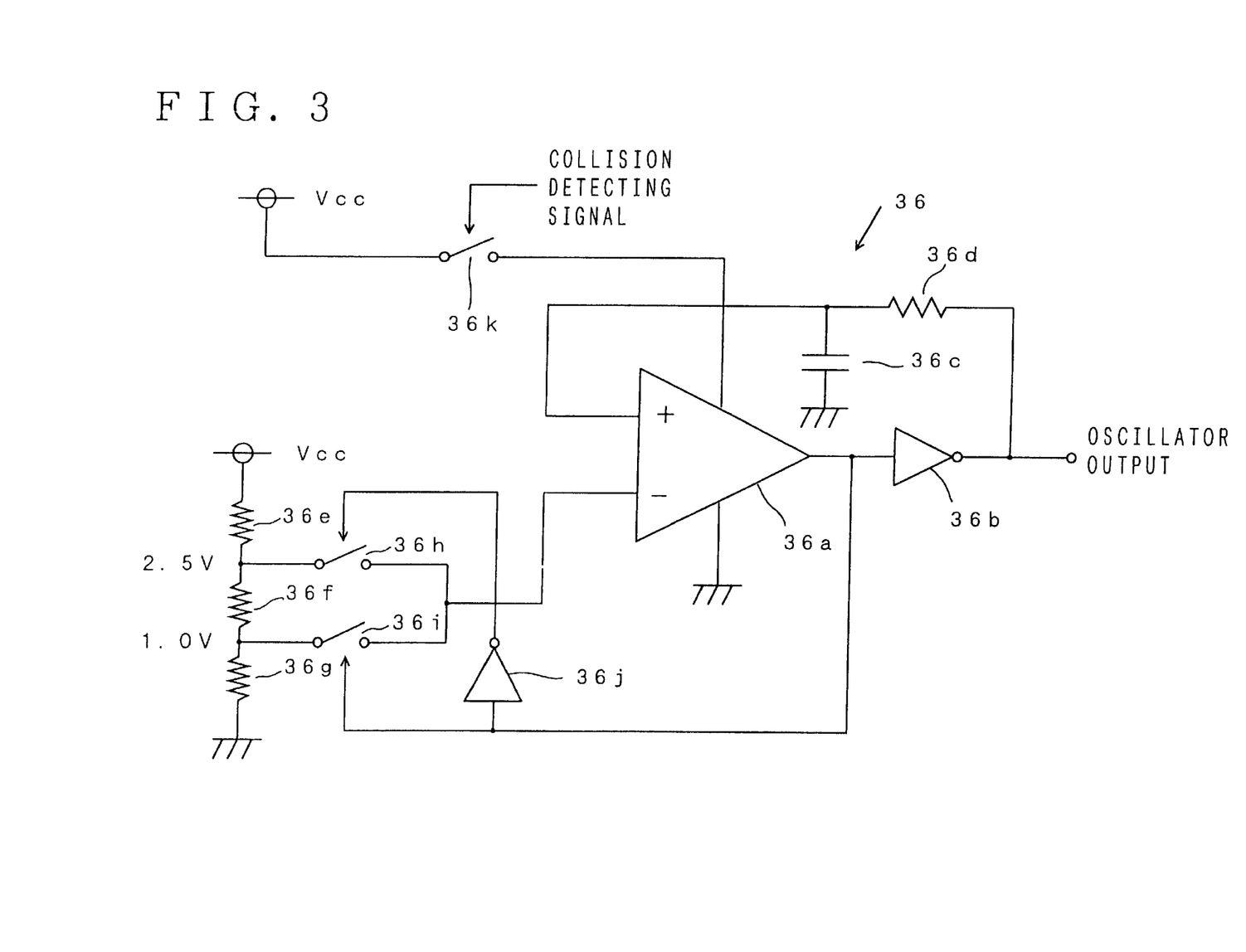
FIG. 3 is a diagram showing a concrete circuit configuration of an oscillator circuit 36 in FIG. 2.

FIG. 3 shows a specific configuration of the oscillator circuit 36.

The oscillator circuit 36 includes an operational amplifier circuit 36a, an inverter 36b inverting the output of the operational amplifier circuit 36a, and capacitor 36c and resistor 36d constituting a time constant circuit connected to the output terminal of the inverter 36b. An output of the time constant circuit is input to the non-inverting input terminal of the operational amplifier circuit 36a.

The oscillator circuit 36 also includes resistors 36e, 36f and 36g for creating two reference voltages (2.5 volts and 1.0 volts), and switches 36h and 36i for selecting which reference voltage should be input to the inverting input terminal of the operational amplifier circuit 36a.

Selection of ON and OFF of the switches 36h and 36i is made by the output of the operational amplifier circuit 36a and an inverter 36j inverting the output.

In such a configuration, if the output of the operational amplifier circuit 36a becomes a low level, the output of the inverter 36b is changed to a high level to start charging of time constant circuit consisting of the capacitor 36c and the resistor 36d. Since a low-level output of the operational amplifier circuit 36a makes a high-level output of the inverter 36j, the switch 36h is turned on and 2.5-volt reference voltage is input to the inverting input terminal of the operational amplifier circuit 36a.

When the voltage across the capacitor 36c in the time constant circuit rises to 2.5 volts, the output of the operational amplifier circuit 36a is the high level and the output of the inverter 36j is the low level. Thus the time constant circuit, consisting of the capacitor 36c and the resistor 36d, starts discharging operation. Further, the high-level output of the operational amplifier circuit 36a turns on the switch 36i to input the 1.0-volt reference voltage to the inverting input terminal of the operational amplifier circuit 36a.

Then when the voltage across the capacitor 36c in the time constant circuit drops to 1.0 volt, the output of the operational amplifier circuit 36a becomes the low level. After that, the above operation is repeated to alternately switch the output of the operational amplifier circuit 36a between the high level and the low level so as to output an oscillation signal from the inverter 36b.

The inverters 33 to 35, 36b and 36j, shown in FIGS. 2 and 3, are activated by a regulated voltage (Vcc) from a regulated power-supply circuit, not shown.

In the embodiment, a switch 36k is also provided on the power line to the operational amplifier circuit 36a, which is turned on or off depending on the signal status of the collision detector 7. The switch 36k is off-state while the collision detecting signal from the collision detector 7 is absent and is turned on when the collision detecting signal is output.

When the vehicle is in a collisionless condition and the collision detector 7 does not output the collision detecting signal, the off state of the switch 36k is maintained without supplying the regulated voltage (Vcc) to the operational amplifier circuit 36a. This makes the operational amplifier circuit 36a inactive to inhibit outputting of the oscillation signal from the oscillator circuit 36. Thus the booster circuits 4 and 5 do not start boosting.

If once the collision detecting signal outputs the collision detecting signal, the switch 36k is turned on to supply the regulated voltage (Vcc) to the operational amplifier circuit 36a. This causes the oscillator circuit 36 to output the oscillator signal and hence to actuate the booster circuits 4 and 5 to perform boosting operation. The air bags are then driven using the boosted voltages from the booster circuits 4 and 5 in the aforementioned manner.

Since the booster circuits 4 and 5 can output desired boosted voltages in a very short time, there is no problem in driving the air bags even if boosting is performed after the collision detector 7 has output the collision detecting signal.

As described above, the oscillator circuit 36 is actuated to perform boosting operation only when required due to a collision condition of the vehicle, and made inactive to inhibit boosting operation in normal collisionless conditions of the vehicle. Thus the noise generation accompanying switching of each circuit element in the booster circuits 4 and 5 can be avoided. Such operation also makes it possible to reduce electric power consumption in normal operation.

A transistor switch element can be used for switches 36h, 36i and 36k.

(Second Embodiment)

While in the first embodiment the operation of the oscillator circuit 36 is stopped in normal collisionless conditions of the vehicle, the oscillator circuit 36 may vary its oscillation frequency instead of stopping the operation.

Figure 4:
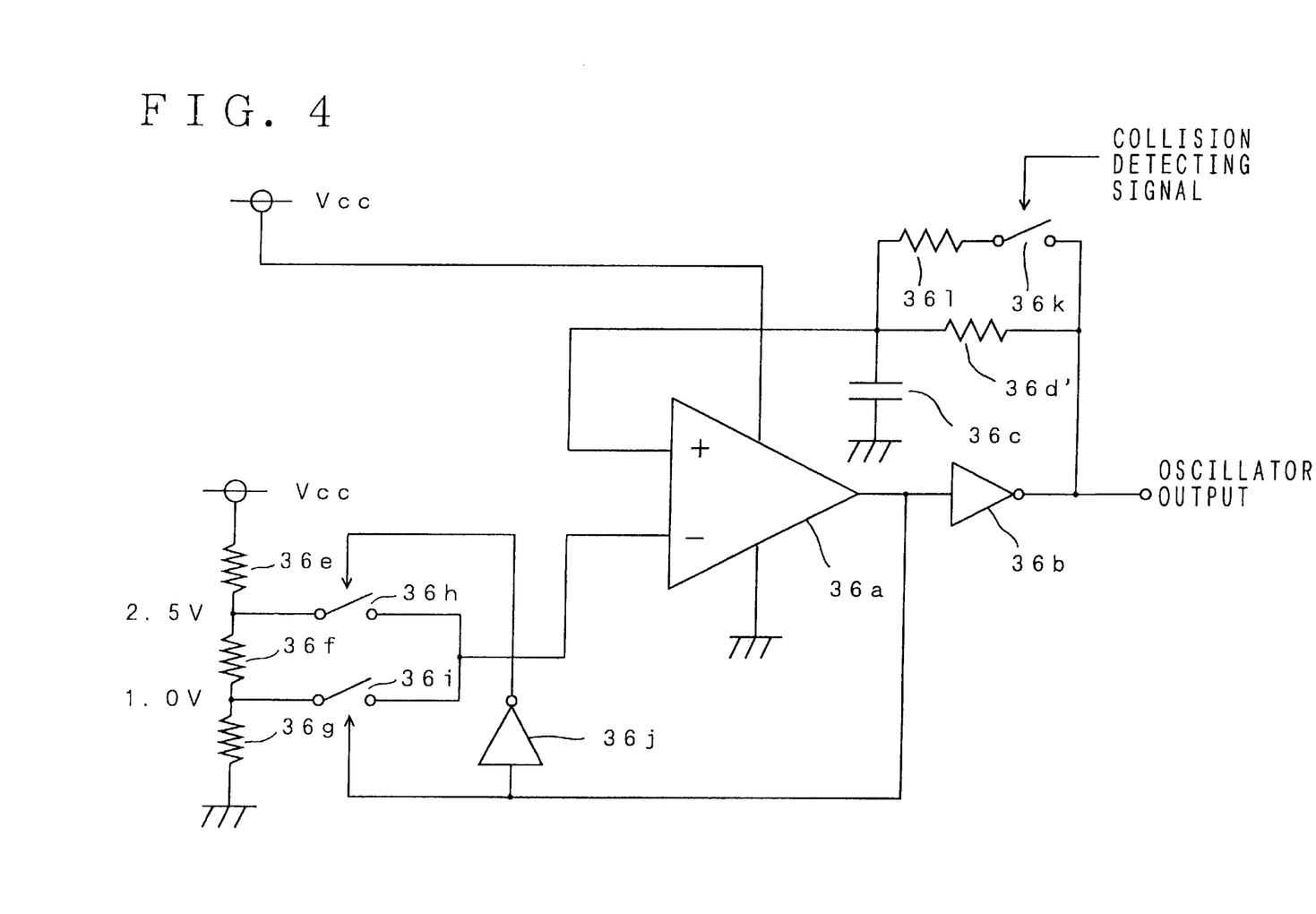
FIG. 4 is a diagram showing a concrete circuit configuration of the oscillator circuit 36 according to the second embodiment of the present invention.

In this case, the oscillation frequency of the oscillator circuit 36 is set in an inaudible range of 20 Hz or less under normal collisionless conditions of the vehicle. Then when the vehicle becomes a collision condition, the oscillation frequency of the oscillator circuit 36 is varied from the initial value to desired one for efficient boosting. Specifically, as shown in FIG. 4, a resistor 36l and the switch 36k are connected in parallel to a resistor 36d' in the time constant circuit. The switch 36k acts in the same manner as that in FIG. 3, which is turned off when the collision detector 7 does not output the collision detecting signal and turned on if once the collision detector 7 outputs the collision detecting signal.

When the collision detector 7 does not output the collision detecting signal, since the switch 36k is off-state, the oscillator circuit 36 oscillates at a frequency determined by the time constant of the resistor 36d' and the capacitor 36c. In this case, the oscillation frequency is set in the inaudible range of 20 Hz or less, so that the number of times each circuit element in the booster circuits 4 and 5 is switched is reduced, thereby reducing noises including such a switching noise as to make crews uncomfortable. This reduction in oscillation frequency also reduces electric power consumption.

When the collision detector 7 outputs the collision detecting signal, since the switch 36k is turned on, the oscillator circuit 36 oscillates at a frequency determined by the time constant of the resistor 36d', the resistor 36l connected in parallel to the resistor 36d' and the capacitor 36c. In this case, the time constant of the time constant circuit becomes small and the oscillation frequency increases. This oscillation frequency corresponds to that of the oscillator circuit 36 in FIG. 3. Thus a desired boosted voltage can be obtained using such an oscillation signal for boosting operation.

(Third Embodiment)

Figure 5:
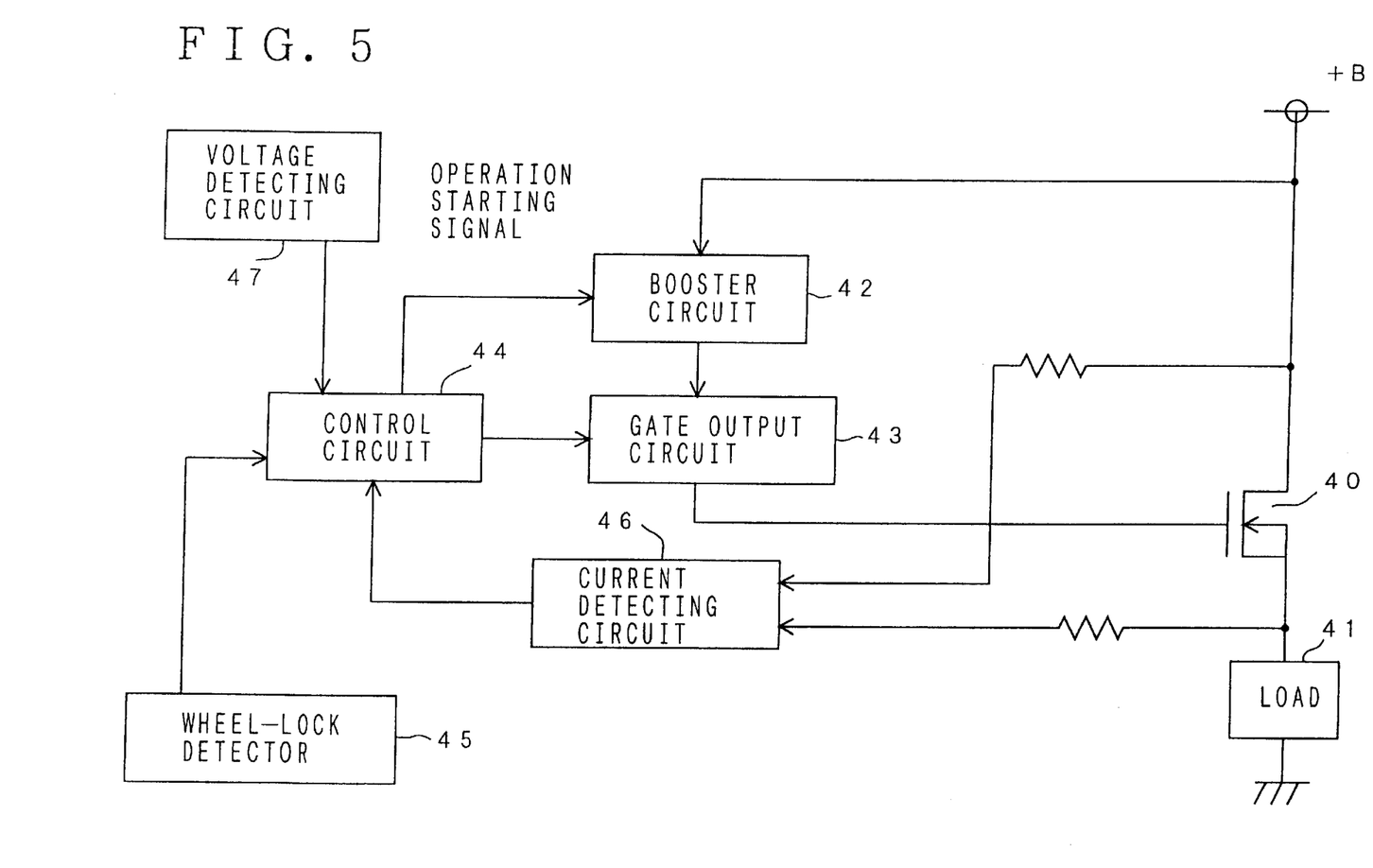
FIG. 5 is a diagram showing a circuit configuration of an ABS according to the third embodiment of the present invention.

FIG. 5 shows the third embodiment. The third embodiment differs from the first embodiment in that the circuit is used in an ABS (Anti-lock Break System) for releasing a wheel-lock condition when the wheel-lock condition of the vehicle is detected.

In the circuit, as shown in FIG. 5, the drain of an output MOS transistor 40 is connected to the battery potential +B, and the source thereof is grounded through a solenoid coil 41 for driving a load, or an ABS. At the gate of the output MOS transistor 40, an output boosted from the potential +B to a prescribed one is input from a booster circuit 42 through a gate output circuit 43.

A signal input from a control circuit 44 to the gate output circuit triggers supply of the output from the booster circuit to the gate of the MOS transistor 40.

A wheel-lock detecting signal input from a wheel-lock detector to the control circuit 44 triggers supply of an operation starting signal to the booster circuit 42 so as to start operation of the booster circuit 42. The wheel-lock detector is for detecting a wheel-lock condition using a signal from a wheel speed sensor or the like.

Other signals are also input to the control circuit 44 from a current detecting circuit 46 and a voltage detecting circuit 47 for protecting the MOS transistor 40 by detecting a voltage across a constant voltage source (e.g., 5-volt power source) and a current flowing in the MOS transistor 40, respectively. Each circuit shown by the block in FIG. 5 is made active by supplying another constant voltage (e.g., 5 volts) generated from the potential +B when an ignition is turned on.

In the circuit configuration, the booster circuit 42 is activated upon supply of the operation starting signal from the control circuit 44 after the signal indicative of a wheel-lock condition is input from the wheel-lock detector 45 to the control circuit 44.

The booster circuit 42 may has a configuration such as one shown in FIG. 3 or FIG. 4, which starts boosting when an oscillator circuit in the booster circuit 42 is actuated by the operation starting signal.

Since the oscillator circuit is actuated only when the wheel-lock condition needs to be released, it is inactive in normal conditions in which the wheels are not locked. Thus the noise generation accompanying switching of each circuit element in the booster circuits 4 and 5 can be avoided. Such operation also makes it possible to reduce electric power consumption in normal operation.

Although in the third embodiment the present invention was applied to the ABS driving circuit, it may also be applied to a circuit for driving a brake assisting system. The same circuit configuration as that in FIG. 5 can be used for this driving circuit.

The characteristics of the present invention can be summarized in that the booster circuits are actuated to drive a current supplying transistor for activating a load such as an air bag upon receipt of a command from the outside to supply current to the current supplying transistor. Especially, as shown in the above embodiments, the present invention is suitable for applications to devices to be activated in an emergency of the vehicle, not in normal operating conditions of the vehicle. This is advantageous since such a driving circuits as in the embodiments is rarely actuated and it is undesirable to issue the noises accompanying continuous actuation of the oscillator circuit.

Although in FIG. 3 cutoff of the Vcc to be supplied to the operational amplifier circuit 36a stops the oscillating action of the oscillator circuit, other circuit configurations may be used for stopping the oscillating action, such as one to keep the oscillation signal from the amplifier at a predetermined value (e.g., ground potential).

In the first, second and third embodiments, configurations other than the charge-up pump circuit in FIG. 2 may also be used for the booster circuits 4, 5 and 42. For example, the booster circuits may be of a self-oscillation type that employs signals supplied to cathodes of its capacitors without provision of an oscillator circuit such as one shown in FIG. 3, or a transformer may also be used.

Further, the transistor receiving outputs from the booster circuits may be of a bipolar type instead of the MOS type in the embodiments.

Furthermore, the first embodiment can be designed to actuate the oscillator circuit 36 only when both a collision condition of the vehicle and disconnection of the battery wiring are detected.

Furthermore, the present invention is applicable to other equipment such as preloaders, other than crew protecting devices such as air bags.

While the present invention has been described with reference to preferred embodiments hereinabove, various modifications and variations may be made without departing from the scope of the invention set fort in the following claims.

What is claimed is:

1. A load driving circuit comprising,
   a load arranged to operate in a prescribed manner with a current supply;
   an output transistor with one terminal connected to a power supply and the other terminal grounded through the load for supplying said current to said load; and
   a booster circuit for boosting an oscillation signal to a prescribed voltage and supplying it to said output transistor, wherein
   said booster circuit has an oscillation circuit for generating said oscillation signal, said oscillation circuit being arranged to generate said oscillation signal only when an instruction signal for supplying said current to said load is input thereto thereby causing said booster circuit to start a boosting operation, and said load operates by said current supply when a vehicle with said load mounted thereon is too unsteady to travel, and the instruction signal is caused by detecting the unsteady traveling condition of the vehicle.

2. A load driving circuit as set forth in claim 1, wherein the unsteady traveling condition of the vehicle denotes that wheels of the vehicle are locked.

3. A load driving circuit as set forth in claim 1, wherein the unsteady traveling condition of the vehicle denotes a collision condition of the vehicle.

4. A driving circuit for a crew protecting device which includes:
   an igniter for actuating the crew protecting device;
   collision detecting means for detecting a collision condition of a vehicle with the crew protecting device mounted thereon and outputting a collision detecting signal;
   an igniting transistor connected in series with said igniter and actuated to start an igniting action of said igniter when the collision detecting signal is output from said collision detecting means; and
   booster circuits for boosting a voltage across vehicle-mounted power supply means,
   said igniting transistor supplying an igniting current to said igniter upon actuation thereof in accordance with the voltage boosted by said booster circuits, wherein
   said booster circuits start boosting in response to output of the collision detecting signal from said collision detecting means.

5. A driving circuit for a crew protecting device as set forth in claim 4, wherein said booster circuits perform boosting operation using such an oscillator circuit as to stop its oscillating action while the collision detecting signal is absent and start it when the collision detecting signal is output from said collision detecting means.

6. A driving circuit for a crew protecting device which includes:
   an igniter for actuating the crew protecting device;
   collision detecting means for detecting a collision condition of a vehicle with the crew protecting device mounted thereon and outputting a collision detecting signal;
   an igniting transistor connected in series with said igniter and actuated to start an igniting action of said igniter when the collision detecting signal is output from said collision detecting means; and
   booster circuits for boosting a voltage across vehicle-mounted power supply means,
   said igniting transistor supplying an igniting current to said igniter upon actuation thereof in accordance with the voltage boosted by said booster circuits, wherein
   said booster circuits perform boosting operation using such an oscillator circuit as to increase its oscillation frequency when the collision detecting signal is output from said collision detecting means.

7. A driving circuit for a crew protecting device as set forth in claim 4, further comprising a constant current circuit provided with a field effect transistor connected in series with said igniter for regulating supply current to said igniter to a constant value, wherein:
   said constant current circuit controls a voltage at the gate of said field effect transistor using the voltage boosted by said booster circuit.

8. A driving circuit for a crew protecting device as set forth in claim 6, further comprising a constant current circuit provided with a field effect transistor connected in series with said igniter for regulating supply current to said igniter to a constant value, wherein:

said constant current circuit controls a voltage at the gate of said field effect transistor using the voltage boosted by said booster circuit.

9. A load driving circuit comprising, a load arranged to operate in a prescribed manner with a current supply;

an output transistor with one terminal connected to a power supply and the other terminal grounded through the load for supplying said current to said load; and a booster circuit for boosting its output to a prescribed voltage and supplying it to said output transistor, wherein said booster circuit starts boosting in response to input of an instruction signal for said current supply to said load, and wherein said load is arranged to operate when a vehicle with said load mounted thereon is too unsteady to travel, and the instruction signal is caused by detecting the unsteady traveling condition of the vehicle.

10. A load driving circuit as set forth in claim 9, wherein the unsteady traveling condition of the vehicle denotes that wheels of the vehicle are locked.

11. A load driving circuit as set forth in claim 9, wherein the unsteady traveling condition of the vehicle denotes a collision condition of the vehicle.

12. A driving circuit for a crew protecting device as set forth in claim 9, further comprising another boosting circuit for supplying a boosted voltage to a constant current circuit associated with said load.

13. A driving circuit for a crew protecting device as set forth in claim 10, further comprising another boosting circuit for supplying a boosted voltage to a constant current circuit associated with said load.

14. A driving circuit for a crew protecting device as set forth in claim 11, further comprising another boosting circuit for supplying a boosted voltage to a constant current circuit associated with said load.

15. A driving circuit for a crew protecting device as set forth in claim 2, further comprising another boosting circuit for supplying a boosted voltage to a constant current circuit associated with said load.

16. A driving circuit for a crew protecting device as set forth in claim 1, further comprising another boosting circuit for supplying a boosted voltage to a constant current circuit associated with said load.

17. A driving circuit for a crew protecting device as set forth in claim 2, further comprising another boosting circuit for supplying a boosted voltage to a constant current circuit associated with said load.

18. A driving circuit for a crew protecting device as set forth in claim 3, further comprising another boosting circuit for supplying a boosted voltage to a constant current circuit associated with said load.

* * * * *